(12) United States Patent
Khandekar et al.

(10) Patent No.: US 9,014,080 B2
(45) Date of Patent: Apr. 21, 2015

(54) APPARATUS AND METHOD FOR PROVIDING RELAY BACKHAUL COMMUNICATIONS IN A WIRELESS COMMUNICATION SYSTEM

(75) Inventors: Aamod Dinkar Khandekar, San Diego, CA (US); Amir Farajidana, San Diego, CA (US); Juan Montojo, San Diego, CA (US); Wanshi Chen, San Diego, CA (US); Alexei Yurievich Gorokhov, San Diego, CA (US); Tingfang Ji, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 803 days.

(21) Appl. No.: 12/916,407

(22) Filed: Oct. 29, 2010

(65) Prior Publication Data

US 2011/0103295 A1  May 5, 2011

Related U.S. Application Data

(60) Provisional application No. 61/256,899, filed on Oct. 30, 2009.

(51) Int. Cl.
*H04W 40/00* (2009.01)
*H04W 72/04* (2009.01)
(Continued)

(52) U.S. Cl.
CPC ........... *H04W 72/04* (2013.01); *H04B 7/15542* (2013.01); *H04B 7/2606* (2013.01); *H04W 72/0406* (2013.01); *H04W 84/047* (2013.01)

(58) Field of Classification Search
CPC ...... H04J 1/14; H04B 7/15542; H04B 7/2606

USPC .......................... 370/279, 293, 315, 329, 492
See application file for complete search history.

(56) References Cited

U.S. PATENT DOCUMENTS 8,406,215 B2 * 3/2013 Papasakellariou et al. ... 370/349
8,514,768 B2 * 8/2013 Noh et al. ...................... 370/315
(Continued)

FOREIGN PATENT DOCUMENTS

EP        2056515 A1    5/2009
KR   20110019330 A     2/2011
(Continued)

OTHER PUBLICATIONS

CATT: "Design of Backhaul Control Channel for Type I Relay in LTE-A",3GPP Draft; R1-093525, 3rd Generation Partnership Project (3GPP), Mobile Competence Centre ; 650, Route Des Lucioles ; F-06921 Sophia-Antipolis Cedex ; France, no. Shenzhen, China; Aug. 19, 2009, XP050351785, [retrieved on Aug. 19, 2009].

(Continued)

*Primary Examiner* — Jay P Patel
(74) *Attorney, Agent, or Firm* — Michael J. DeHaemer, Jr.

(57) ABSTRACT

An apparatus and method for designing a relay backhaul channel in a wireless communication system are provided. At least one relay node utilized for communication with respective user devices and at least one relay backhaul channel for conducting in-band half-duplex communication with the at least one relay node are identified. The relay backhaul channel may be an FDM channel, a TDM/FDM channel, or a joint R-PDCCH/R-PDSCH channel. The relay channel is used for communicating with the at least one relay node. The supportable ranks of the R-PDSCH channel may depend on the number of resources reserved for demodulation reference signals in the R-PDCCH region.

63 Claims, 11 Drawing Sheets

(51) Int. Cl.
*H04B 7/155* (2006.01)
*H04B 7/26* (2006.01)
*H04W 84/04* (2009.01)

(56) References Cited

U.S. PATENT DOCUMENTS

| | | | | |
|---|---|---|---|---|
| 8,547,896 | B2* | 10/2013 | Park et al. | 370/315 |
| 8,565,184 | B2* | 10/2013 | Seo et al. | 370/330 |
| 8,675,588 | B2* | 3/2014 | Fujishima et al. | 370/329 |
| 2002/0191635 | A1 | 12/2002 | Chow et al. | |
| 2010/0027456 | A1* | 2/2010 | Onggosanusi et al. | 370/312 |
| 2010/0097978 | A1* | 4/2010 | Palanki et al. | 370/315 |
| 2010/0296465 | A1* | 11/2010 | Hooli et al. | 370/329 |
| 2011/0051654 | A1* | 3/2011 | Blankenship et al. | 370/315 |
| 2011/0103292 | A1* | 5/2011 | Pasad et al. | 370/315 |
| 2011/0176502 | A1* | 7/2011 | Chung et al. | 370/329 |
| 2011/0211467 | A1* | 9/2011 | Bhat | 370/252 |
| 2011/0317616 | A1* | 12/2011 | Seo et al. | 370/315 |
| 2012/0155561 | A1 | 6/2012 | Seo et al. | |
| 2012/0201318 | A1* | 8/2012 | Seo et al. | 375/260 |
| 2012/0213147 | A1 | 8/2012 | Noh et al. | |

FOREIGN PATENT DOCUMENTS

| | | | |
|---|---|---|---|
| WO | WO-2004008793 | A1 | 1/2004 |
| WO | WO-2007137201 | A2 | 11/2007 |
| WO | WO-2011049379 | A2 | 4/2011 |
| WO | WO-2011049401 | A2 | 4/2011 |

OTHER PUBLICATIONS

CATT: "Design of reference signals for relay backhaul link in LTE-A", 3GPP Draft; R1-094152, 3rd Generation Partnership Project (3GPP), Mobile Competence Centre ; 650, Route Des Lucioles ; F-06921 Sophia-Antipolis Cedex ; France, no. Miyazaki; Oct. 12, 2009, XP050388622, [retrieved on Oct. 6, 2009].
International Search Report and Written Opinion—PCT/US2010/054884—International Search Authority, European Patent Office,Jan. 31, 2011.
Nokia Siemens Networks et al: "Control Channel for Relay Backhaul link" 3GPP Draft; R1-091763_Control Relays Backhaul, 3rd Generation Partnership Project (3GPP), Mobile Competence Centre ; 650, Route Des Lucioles ; F-06921 Sophia-Antipolis Cedex ; France, no. San Francisco, USA; Apr. 28, 2009, XP050339287 [retrieved on Apr. 28, 2009] p. 1, line 4-line 7 p. 1, line 9-line 30 p. 2, line 4-line 12 main figure; p. 2 p. 3, line 24-line 29.
Nokia Siemens Networks: "TP to 36.912 on Relays and Carrier Aggregation" 3GPP Draft; R2-093694 TP 36912 on Relays and CA, 3rd Generation Partnership Project (3GPP), Mobile Competence Centre ; 650, Route Des Lucioles F-06921 Sophia-Antipolis C E ~ E X ; France, no. Los Angeles, USA; Jun. 24, 2009, XP050351931 [ retrieved on 2009-06-241 p. 4, paragraph 9.1, lines 1-2 p. 4, paragraph 9.3.1: lines 1-3 p. 5 , paragraph 9.3.3, lines 7-14 p. 4, figu e 9.1-1.
ZTE: "Considerations on Control Channel of Backhaul Link", 3GPP Draft; R1-093814, 3rd Generation Partnership Project (3GPP), Mobile Competence Centre ; 650, Route Des Lucioles ; F-06921 Sophia-Antipolis Cedex ; France, no. Miyazaki; Oct. 12, 2009, XP050388327, [retrieved on Oct. 5, 2009].
ZTE: "Considerations on Demodulation Reference Signal in Backhaul Downlink", 3GPP Draft; R1-093204_Backhauldmrs, 3rd Generation Partnership Project (3GPP), Mobile Competence Centre ; 650, Route Des Lucioles ; F-06921 Sophia-Antipolis Cedex ; France, no. Shenzhen, China; Aug. 19, 2009, XP050351557.
Taiwan Search Report—TW099137523—TIPO—Jun. 20, 2013.

* cited by examiner

APPARATUS AND METHOD FOR PROVIDING RELAY BACKHAUL COMMUNICATIONS IN A WIRELESS COMMUNICATION SYSTEM

CROSS REFERENCE TO RELATED APPLICATIONS

This application claims priority to U.S. Provisional Patent Application No. 61/256,899, filed on Oct. 30, 2009, herein incorporated by reference in its entirety.

FIELD

This application relates generally to relay backhaul communications in a wireless communication system. More particularly, but not exclusively, this application relates to techniques for designing a relay backhaul channel in a wireless communication system.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access ("CDMA") systems, time division multiple access ("TDMA") systems, frequency division multiple access ("FDMA") systems, 3GPP Long Term Evolution ("LTE") systems, and orthogonal frequency division multiple access ("OFDMA") systems.

Generally, a wireless multiple-access communication system can simultaneously support communications for multiple wireless terminals. Each terminal communicates with one or more base stations via transmissions on the forward and reverse links. The forward link (or downlink) refers to the communications link from the base stations to the terminals, and the reverse link (or uplink) refers to the communications link from the terminals to the base stations. This communications link may be established via a single-in-single-out, multiple-in-signal-out, or a multiple-in-multiple-out ("MIMO") system.

Generally, wireless cellular communication networks incorporate a number of mobile user equipments ("UEs") and a number of base nodes ("NodeBs"). A NodeB is generally a fixed station, and may also be called a base transceiver system ("BTS"), an access point ("AP"), a base station ("BS"), or some other equivalent terminology. As improvements to networks are made, the NodeB functionality has evolved, so a NodeB is sometimes also referred to as an evolved NodeB ("eNB"). In general, NodeB hardware, when deployed, is fixed and stationary, while UE hardware is portable.

In contrast to a NodeB, a mobile UE can comprise portable hardware. A UE, also commonly referred to as a terminal or a mobile station, may be a fixed or mobile device, and may be a wireless device, a cellular phone, a personal digital assistant ("PDA"), a wireless modem card, and so on. Uplink communication ("UL") refers to a communication from a mobile UE to a NodeB, whereas downlink ("DL") refers to a communication from a NodeB to a mobile UE.

Each NodeB contains radio frequency transmitter(s) and the receiver(s) used to communicate directly with the mobile UEs, which move freely around it. Similarly, each mobile UE contains radio frequency transmitter(s) and receiver(s) used to communicate directly with a NodeB. In cellular networks, the mobile UEs cannot communicate directly with each other but have to communicate with the NodeB.

Relay Nodes ("RNs") have been considered for use in a wireless communication system. A RN may be located between terminals, UEs, and base stations, such as eNBs, to provide range extension, increase data rates, facilitate UE mobility, improve cell edge coverage, as well as providing other functions. Different types of RNs may be implemented, including, for example, a "Type 1" RN, which refers to an RN that appears as an independent NodeB to a UE. As such, a Type 1 RN can transmit its own synchronization channels, control channels, and so on.

Further, an in-band half-duplex RN which is not able to transmit and receive on the same band at the same time, may be supported by a wireless communication system. It is currently appreciated that Multimedia Broadcast over a Single Frequency Network ("MBSFN") intervals can be used in order to create "blank periods" in which to receive DL communications from a donor NodeB on the backhaul link. However, due to the nature of MBSFN subframes (e.g., they contain PDCCH transmissions lasting one or two OFDM symbols), it is appreciated that the RN can in some cases be unable to listen to PDCCH transmissions from the donor NodeB. As a result, one or more relay control channels (e.g., R-PDCCH, R-PHICH, P-PCFICH, etc.) can be implemented between a NodeB and an RN. The present application therefore addresses various aspects related to the design of a relay backhaul channel.

SUMMARY

This disclosure relates generally to apparatus and methods for facilitating wireless communications with relay nodes ("RNs"). A RN may be located between terminals, UEs, and base stations, such as eNBs, to provide range extension, increase data rates, facilitate UE mobility, improve cell edge coverage, as well as providing other functions. A relay backhaul channel for conducting in-band half-duplex communication with the least one RN is provided. The relay backhaul channel may be an FDM channel, a TDM/FDM channel, or a joint R-PDCCH/R-PDSCH channel.

In one aspect, this disclosure relates to a method for facilitating relay backhaul communication in a wireless communication system using at least one relay node. At least one relay node utilized for communication with respective user devices is identified. At least one relay backhaul control channel for conducting communication with the at least one relay node, wherein the at least one relay backhaul control channel comprises a control portion of a first set of resource blocks (RBs), is also identified. In the control portion of the first set of RBs, a first set of resources providing reference signals configured for demodulation of the at least one relay backhaul control channel is identified. In the control portion of the first set of RBs, a second set of resources providing reference signals configured for demodulation of at least one relay backhaul data channel, the second set of resources including at least the first set of resources is identified. Communication is conducted with the at least one relay node using the at least one relay backhaul control channel.

In a further aspect, this disclosure relates to an apparatus for facilitating relay backhaul communication in a wireless communication system, including at least one relay node utilized for communication with respective user devices, at least one relay backhaul control channel for conducting communication with the at least one relay node, wherein the at least one relay backhaul control channel comprises a control portion of a first set of resource blocks (RBs), a first set of resources in the control portion of the first set of RBs, the first set of resources providing reference signals configured for demodulation of the at least one relay backhaul control channel, and a second set of resources in the control portion of the first set of RBs, the second set of resources providing reference signals configured for demodulation of at least one relay backhaul data channel and including at least the first set of resources.

In yet another aspect, this disclosure relates to a computer program product for facilitating relay backhaul communication in a wireless communication system using at least one relay node and including code for identifying at least one relay node utilized for communication with respective user devices, identifying at least one relay backhaul control channel for conducting communication with the at least one relay node, wherein the at least one relay backhaul control channel comprises a control portion of a first set of resource blocks (RBs), identifying, in the control portion of the first set of RBs, a first set of resources providing reference signals configured for demodulation of the at least one relay backhaul control channel, identifying, in the control portion of the first set of RBs, a second set of resources providing reference signals configured for demodulation of at least one relay backhaul data channel, the second set of resources including at least the first set of resources, and communicating with the at least one relay node using the at least one relay backhaul control channel.

In another aspect, this disclosure relates to an apparatus for facilitating relay backhaul communication in a wireless communication system using at least one relay node, the apparatus including means for identifying at least one relay node utilized for communication with respective user devices, means for identifying at least one relay backhaul control channel for conducting communication with the at least one relay node, wherein the at least one relay backhaul control channel comprises a control portion of a first set of resource blocks (RBs), means for identifying, in the control portion of the first set of RBs, a first set of resources providing reference signals configured for demodulation of the at least one relay backhaul control channel, means for identifying, in the control portion of the first set of RBs, a second set of resources providing reference signals configured for demodulation of at least one relay backhaul data channel, the second set of resources including at least the first set of resources, and means for communicating with the at least one relay node using the at least one relay backhaul control channel.

The disclosure further relates to computer program products, devices, apparatus, and system for implementing the above-described methods, as well as others described herein. Various additional aspects are further described below in conjunction with the appended drawings.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
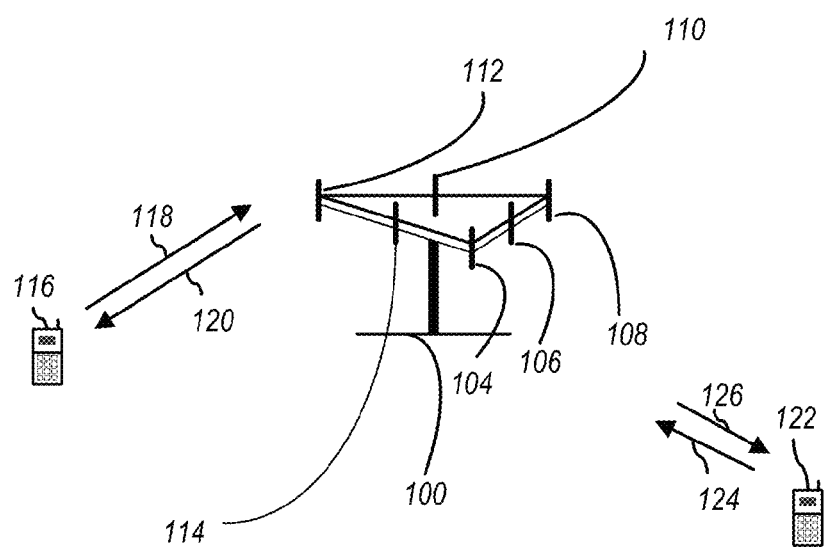
FIG. 1 illustrates a wireless communication system on which exemplary embodiments may be implemented.

Systems and methods are disclosed to facilitate wireless communications with relay nodes ("RNs"). A RN may be located between terminals, UEs, and base stations, such as eNBs, to provide range extension, increase data rates, facilitate UE mobility, improve cell edge coverage, as well as providing other functions. Different types of RNs may be implemented, including, for example, a "Type 1" RN, which refers to an RN that appears as an independent NodeB to a UE. As such, a Type 1 RN can transmit its own synchronization channels, control channels, and so on.

An in-band half-duplex RN which is not able to transmit and receive on the same band at the same time, may also be supported by a wireless communication system. It is currently appreciated that Multimedia Broadcast over a Single Frequency Network ("MBSFN") intervals can be used in order to create "blank periods" in which to receive DL communications from a donor NodeB on the backhaul link. However, due to the nature of MBSFN subframes (e.g., they contain PDCCH transmissions lasting one or two OFDM symbols), it is appreciated that the RN can in some cases be unable to listen to PDCCH transmissions from the donor NodeB. As a result, one or more relay control channels (e.g., R-PDCCH, R-PHICH, P-PCFICH, etc.) can be implemented between a NodeB and an RN. Accordingly, systems and methods for designing a relay backhaul channel are described herein below.

In various embodiments, the techniques described herein may be used for various wireless communication networks such as Code Division Multiple Access ("CDMA") networks, Time Division Multiple Access ("TDMA") networks, Frequency Division Multiple Access ("FDMA") networks, Orthogonal FDMA ("OFDMA") networks, Single-Carrier FDMA ("SC-FDMA") networks, as well as other communication networks. As described herein, the terms "networks" and "systems" are often used interchangeably.

A CDMA network may implement a radio technology such as Universal Terrestrial Radio Access ("UTRA"), cdma2000, and the like. UTRA includes Wideband-CDMA ("W-CDMA") and Low Chip Rate ("LCR"). Cdma2000 covers IS-2000, IS-95 and IS-856 standards. A TDMA network may implement a radio technology such as Global System for Mobile Communications ("GSM").

An OFDMA network may implement a radio technology such as Evolved UTRA ("E-UTRA"), IEEE 802.11, IEEE 802.16, IEEE 802.20, Flash-OFDM, and the like. UTRA, E-UTRA, and GSM are part of Universal Mobile Telecommunication System ("UMTS"). In particular, Long Term Evolution ("LTE") is an upcoming release of UMTS that uses E-UTRA. UTRA, E-UTRA, GSM, UMTS and LTE are described in documents from an organization named "3rd Generation Partnership Project" ("3GPP"), and cdma2000 is described in documents from an organization named "3rd Generation Partnership Project 2" (3GPP2).

These various radio technologies and standards are known in the art. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices. For clarity, certain aspects of the apparatus and methods are described below for LTE, and LTE terminology is used in much of the description below; however, the description is not intended to be limited to LTE applications. Accordingly, it is appreciated by one of skill in the art that the apparatus and methods described herein may be applied to various communications systems and applications.

Single carrier frequency division multiple access ("SC-FDMA"), which utilizes single carrier modulation and frequency domain equalization is one communications technique of interest. SC-FDMA has a similar performance and essentially the same overall complexity as OFDMA. However, an SC-FDMA signal has a lower peak-to-average power ratio ("PAPR") than an OFDMA signal because of its inherent single carrier structure. As a result, SC-FDMA has drawn great attention recently, especially for uplink communications where lower PAPR greatly benefits the mobile terminal in terms of transmit power efficiency. Use of SC-FDMA is currently a working assumption for uplink multiple access schemes in 3GPP Long Term Evolution ("LTE"), or E-UTRA.

Logical channels in wireless communications systems may be classified into Control Channels and Traffic Channels. Logical Control Channels may comprise a Broadcast Control Channel ("BCCH") which is a downlink ("DL") channel for broadcasting system control information, a Paging Control Channel ("PCCH") which is a DL channel that transfers paging information, and a Multicast Control Channel ("MCCH") which is a Point-to-multipoint DL channel used for transmitting Multimedia Broadcast and Multicast Service ("MBMS") scheduling and control information for one or several Multicast Traffic Channel(s) ("MTCHs"). Generally, after establishing a Radio Resource Control ("RCC") connection, this channel is only used by UEs that receive MBMS. Further, a Dedicated Control Channel ("DCCH") is a Point-to-point bi-directional channel that transmits dedicated control information and is used by UEs having an RRC connection.

Logical Traffic Channels may comprise a Dedicated Traffic Channel ("DTCH") which is a Point-to-point bi-directional channel, dedicated to one UE, for the transfer of user information, and a MTCH, which is a point-to-multipoint DL channel for transmitting traffic data.

Transport Channels may be classified into Downlink ("DL") and Uplink ("UL"). DL Transport Channels may comprise a Broadcast Channel ("BCH"), a Downlink Shared Data Channel ("DL-SDCH"), and a Paging Channel ("PCH"). The PCH may be used for support of UE power saving (e.g., when a DRX cycle is indicated by the network to the UE), broadcasted over entire cell and mapped to physical layer ("PHY") resources which can be used for other control/traffic channels. The UL Transport Channels may comprise a Random Access Channel ("RACH"), a Request Channel ("REQCH"), an Uplink Shared Data Channel ("UL-SDCH"), and a plurality of PHY channels. The PHY channels may comprise a set of DL channels and UL channels.

In addition, the DL PHY channels may comprise the following channels:
  Common Pilot Channel ("CPICH")
  Synchronization Channel ("SCH")
  Common Control Channel ("CCCH")
  Shared DL Control Channel ("SDCCH")
  Multicast Control Channel ("MCCH")
  Shared UL Assignment Channel ("SUACH")
  Acknowledgement Channel ("ACKCH")
  DL Physical Shared Data Channel ("DL-PSDCH")
  UL Power Control Channel ("UPCCH")
  Paging Indicator Channel ("PICH")
  Load Indicator Channel ("LICH")

The UL PHY channels may in turn comprise the following set of channels:
  Physical Random Access Channel ("PRACH")
  Channel Quality Indicator Channel ("CQICH")
  Acknowledgement Channel ("ACKCH")
  Antenna Subset Indicator Channel ("ASICH")
  Shared Request Channel ("SREQCH")
  UL Physical Shared Data Channel ("UL-PSDCH")
  Broadband Pilot Channel ("BPICH")

For the purposes of explanation or various embodiments, the following terminology and abbreviations may be used herein:
  AM Acknowledged Mode
  AMD Acknowledged Mode Data
  ARQ Automatic Repeat Request
  BCCH Broadcast Control Channel
  BCH Broadcast Channel
  C- Control-
  CCCH Common Control Channel
  CCH Control Channel
  CCTrCH Coded Composite Transport Channel
  CP Cyclic Prefix
  CRC Cyclic Redundancy Check
  CTCH Common Traffic CHannel
  DCCH Dedicated Control Channel
  DCH Dedicated Channel
  DL Downlink
  DSCH Downlink Shared Channel
  DTCH Dedicated Traffic Channel
  DCI Downlink Control Information
  FACH Forward link Access Channel
  FDD Frequency Division Duplex
  L1 Layer 1 (physical layer)
  L2 Layer 2 (data link layer)
  L3 Layer 3 (network layer)
  LI Length Indicator
  LSB Least Significant Bit
  MAC Medium Access Control
  MBMS Multimedia Broadcast Multicast Service
  MCCH MBMS Point-to-Multipoint Control Channel
  MRW Move Receiving Window
  MSB Most Significant Bit
  MSCH MBMS Point-to-Multipoint Scheduling Channel
  MTCH MBMS Point-to-Multipoint Traffic Channel
  PCCH Paging Control Channel
  PCH Paging Channel
  PDU Protocol Data Unit PHY Physical Layer
PhyCH Physical Channels
RACH Random Access Channel
RLC Radio Link Control
RRC Radio Resource Control
SAP Service Access Point
SDU Service Data Unit
SHCCH Shared Channel Control Channel
SN Sequence Number
SUFI Super Field
TCH Traffic Channel
TDD Time Division Duplex
TFI Transport Format Indicator
TM Transparent Mode
TMD Transparent Mode Data
TTI Transmission Time Interval
U- User-
UE User Equipment
UL Uplink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multicast Broadcast Single Frequency Network
MCE MBMS Coordinating Entity
MCH Multicast Channel
DL-SCH Downlink Shared Channel
MSCH MBMS Control Channel
PDCCH Physical Downlink Control Channel
PDSCH Physical Downlink Shared channel
PCFICH Physical Control Format Indicator Channel A MIMO system employs multiple ("$N_T$") transmit antennas and multiple ("$N_R$") receive antennas for data transmission. A MIMO channel formed by the $N_T$ transmit and $N_R$ receive antennas may be decomposed into $N_S$ independent channels, which are also referred to as spatial channels, where $N_S \min\{N_T, N_R\}$, and each of the $N_S$ independent channels corresponds to a dimension. This provides an $N_S$ increase in spectral efficiency. A MIMO system can provide improved performance (e.g., higher throughput and/or greater reliability) if the additional dimensionalities created by the multiple transmit and receive antennas are utilized. The special dimension may be described in terms of a rank.

MIMO systems supports both time division duplex ("TDD") and frequency division duplex ("FDD") implementations. In a TDD system, the forward and reverse link transmissions use the same frequency regions so that the reciprocity principle allows the estimation of the forward link channel from the reverse link channel. This enables the access point to extract transmit beamforming gain on the forward link when multiple antennas are available at the access point.

System designs may support various time-frequency reference signals for the downlink and uplink to facilitate beamforming and other functions. A reference signal is a signal generated based on known data and may also be referred to as a pilot, preamble, training signal, sounding signal and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas, however, LTE systems do not in general provide for coordination of sending of reference signals from multiple base stations or eNBs.

3GPP Specification 36211-900 defines in Section 5.5 particular reference signals for demodulation, associated with transmission of PUSCH or PUCCH, as well as sounding, which is not associated with transmission of PUSCH or PUCCH. For example, Table I lists some reference signals for LTE implementations that may be transmitted on the downlink and uplink and provides a short description for each reference signal. A cell-specific reference signal may also be referred to as a common pilot, a broadband pilot and the like. A UE-specific reference signal may also be referred to as a dedicated reference signal.

TABLE I

LTE Reference Signals

| Link | Reference Signal | Description |
| --- | --- | --- |
| Downlink | Cell Specific Reference Signal | Reference signal sent by a Node B and used by the UEs for channel estimation and channel quality measurement. |
| Downlink | UE Specific Reference Signal | Reference signal sent by a Node B to a specific UE and used for demodulation of a downlink transmission from the Node B. |
| Uplink | Sounding Reference Signal | Reference signal sent by a UE and used by a Node B for channel estimation and channel quality measurement. |
| Uplink | Demodulation Reference Signal | Reference signal sent by a UE and used by a Node B for demodulation of an uplink transmission from the UE. |

In some implementations a system may utilize time division duplexing ("TDD"). For TDD, the downlink and uplink share the same frequency spectrum or channel, and downlink and uplink transmissions are sent on the same frequency spectrum. The downlink channel response may thus be correlated with the uplink channel response. A reciprocity principle may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations orthogonal frequency division multiplexing is used for the downlink—that is, from a base station, access point or eNodeB ("eNB") to a terminal or UE. Use of OFDM meets the LTE requirement for spectrum flexibility and enables cost-efficient solutions for very wide carriers with high peak rates, and is a well-established technology, for example OFDM is used in standards such as IEEE 802.11a/g, 802.16, HIPERLAN-2, DVB and DAB.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in 3GPP TS 36.211.

UMTS LTE supports scalable carrier bandwidths from 20 MHz down to 1.4 MHZ. In LTE, an RB is defined as 12 sub-carriers when the sub-carrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every sub frame consists of 2 slots, where each slot is 0.5 ms. The subcarrier spacing in the frequency domain in this case is 15 kHz. Twelve of these subcarriers together (per slot) constitutes an RB, so in this implementation one resource block is 180 kHz. Six resource blocks fit in a carrier of 1.4 MHz and one hundred resource blocks fit in a carrier of 20 MHz.

In the downlink there are typically a number of physical channels as described above. In particular, the Physical Downlink Control Channel ("PDCCH") is used for sending control, the Physical Hybrid ARQ Indicator Channel ("PH-ICH") for sending ACK/NACK, the Physical Control Format Indicator Channel ("PCFICH") for specifying the number of control symbols, the Physical Downlink Shared Channel ("PDSCH") for data transmission, the Physical Multicast Channel ("PMCH") for broadcast transmission using a Single Frequency Network ("SFN"), and the Physical Broadcast Channel ("PBCH") for sending important system information within a cell. Supported modulation formats on the PDSCH in LTE are QPSK, 16QAM and 64QAM. Various modulation and coding schemes are defined for the various channels in the 3GPP specification.

In the uplink there are typically three physical channels. While the Physical Random Access Channel ("PRACH") is only used for initial access and when the UE is not uplink synchronized, the data is sent on the Physical Uplink Shared Channel ("PUSCH"). If there is no data to be transmitted on the uplink for a UE, control information would be transmitted on the Physical Uplink Control Channel ("PUCCH"). Supported modulation formats on the uplink data channel are QPSK, 16QAM and 64QAM.

If virtual MIMO/Spatial Division Multiple Access ("SDMA") is introduced the data rate in the uplink direction can be increased depending on the number of antennas at the base station. With this technology more than one mobile can reuse the same resources. For MIMO operation, a distinction is made between single user MIMO, for enhancing one user's data throughput, and multi user MIMO for enhancing the cell throughput.

In 3GPP LTE, a mobile station or device may be referred to as a "terminal," "user device," or "user equipment" ("UE"). A base station may be referred to as an evolved NodeB or eNB. A semi-autonomous base station may be referred to as a home eNB or HeNB. An HeNB may thus be one example of an eNB. The HeNB and/or the coverage area of an HeNB may be referred to as a femtocell, an HeNB cell or a closed subscriber group (CSG) cell (where access is restricted).

Various other aspects and features of the disclosure are further described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

It is appreciated that the word "exemplary" is used herein to mean "serving as an example, instance, or illustration". Any embodiment described herein as "exemplary" is not necessarily to be construed as preferred or advantageous over other embodiments.

FIG. 1 illustrates details of an implementation of a multiple access wireless communication system, which may be an LTE system, on which aspects as further described subsequently may be implemented. In various implementations, an access point ("AP"), such as AP 100 of FIG. 1, may be a fixed station used for communicating with access terminals and may be referred to as an access point, a NodeB, an eNodeB, a home eNobeB ("HeNB"), or by other terminology. An access terminal ("AT"), such as AT 116 or AT 122 of FIG. 1, may be called an access terminal, a user equipment ("UE"), a wireless communication device, terminal, access terminal, or by other terminology. ATs 116 and 122 and UE 100 may be configured to implement various aspects of embodiments as are described herein.

An access point 100 may include multiple antenna groups, one including 104 and 106, another including 108 and 110, and an additional including 112 and 114. In FIG. 1, only two antennas are shown for each antenna group; however, more or fewer antennas may be utilized for each antenna group in various embodiments.

Access terminal 116 is in communication with antennas 112 and 114, where antennas 112 and 114 transmit information to AT 116 over forward link 120 and receive information from AT 116 over reverse link 118. Access terminal 122 is in communication with antennas 106 and 108, where antennas 106 and 108 transmit information to AT 122 over forward link 126 and receive information from AT 122 over reverse link 124.

In a FDD system, communication links 118, 120, 124 and 126 may use different frequencies for communication between AP 100 and ATs 116 and 122. For example, forward link 120 may use a frequency that is different than that used by reverse link 118. Likewise, links 124 and 126 may use different frequencies from each other and/or from links 118 and 120.

Each group of antennas and/or the area in which they are designed to communicate may be referred to as a sector of the access point. In the illustrated exemplary embodiment, antenna groups are each designed to communicate with access terminals in a designated sector of the area covered by access point 100. For example, the antenna group including antennas 112 and 114 may be assigned to a sector designated as Sector 1 in FIG. 1, while the antenna group including antennas 106 and 108 may be assigned to a sector designated as Sector 2.

In communication over forward links 120 and 126, the transmitting antennas of access point 100 may be configured to utilize beamforming in order to improve the signal-to-noise ratio of forward links for the different access terminals 116 and 122, as well as others (not shown). Also, in typical implementations, an access point using beamforming to transmit to access terminals scattered randomly throughout its coverage area may cause less interference to access terminals in neighboring cells than an access point transmitting through a single antenna to all its access terminals. It is appreciated that precoding of transmit signals may be used to facilitate beamforming.

Figure 2:
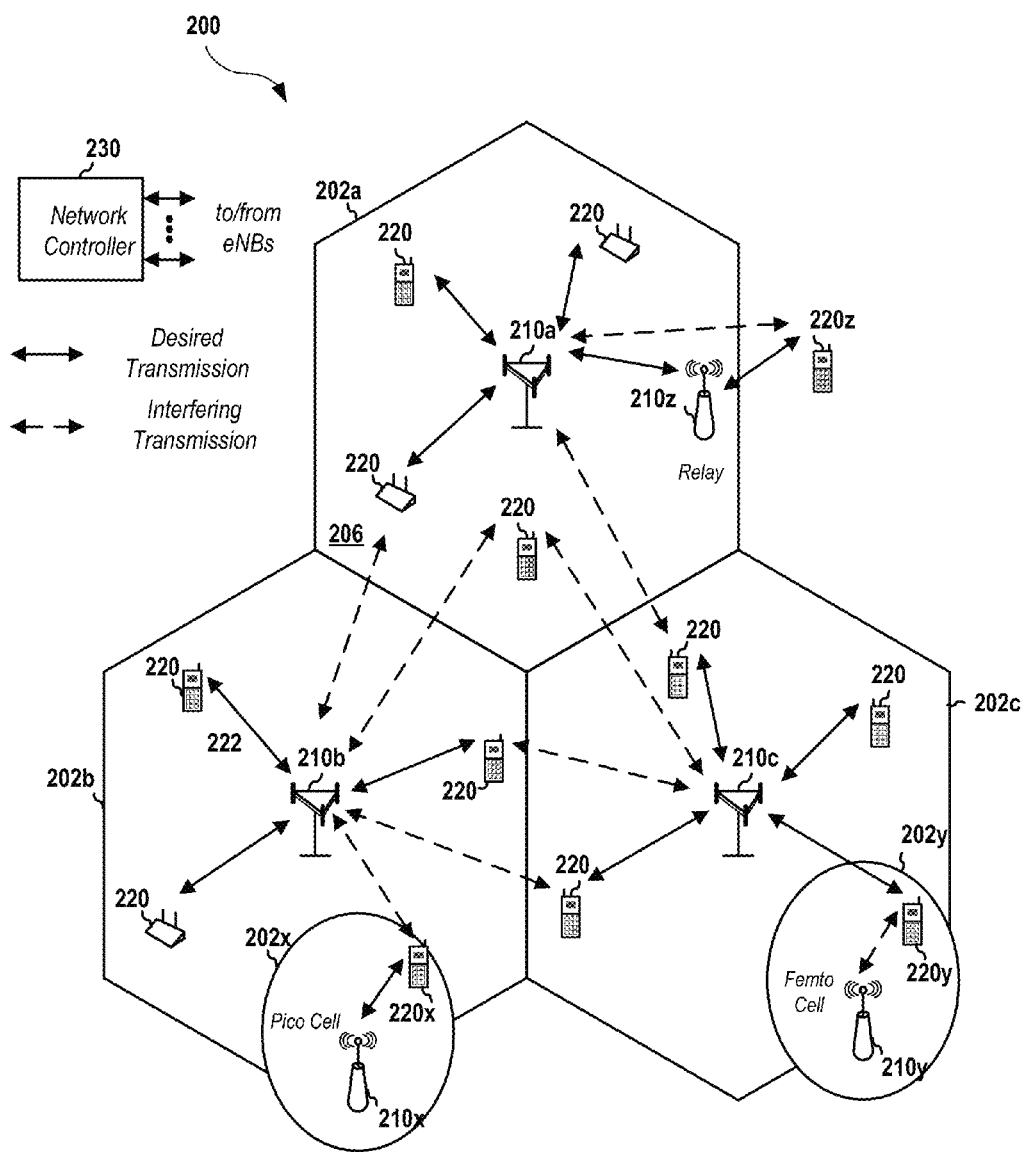
FIG. 2 illustrates a wireless communication network for use with the wireless communication system of FIG. 1.

FIG. 2 illustrates a wireless communication network 200, which may be an LTE network. Wireless network 200 may include a number of evolved Node Bs ("eNBs") 210 and other network entities. An eNB may be a station that communicates with the UEs and may also be referred to as a base station, a Node B, an access point, etc. Each eNB 210 may provide communication coverage for a particular geographic area. To improve network capacity, the overall coverage area of an eNB may be partitioned into multiple (e.g., three) smaller areas. In 3GPP, the term "cell" can refer to the smallest coverage area of an eNB and/or an eNB subsystem serving this coverage area, depending on the context in which the term is used.

Wireless network 200 may also include relay stations or nodes ("RNs"). A relay node is a station that receives a transmission of data and/or other information from an upstream station (e.g., an eNB or a UE) and sends a transmission of the data and/or other information to a downstream station (e.g., a UE or an eNB). In the example shown in FIG. 2, a relay node 210z may communicate with eNB 210a and a UE 220z to facilitate communication between eNB 210a and UE 220z. A relay node may also be referred to as a relay eNB, a relay, etc. In the description herein, a "station" may be a UE, a relay node or RN, or some other entity capable of receiving and sending information.

A network controller 230 may couple to a set of eNBs and provide coordination and control for these eNBs. Network controller 230 may be a single network entity or a collection of network entities. Network controller 230 may communicate with eNBs 210 via a backhaul. eNBs 210 may also communicate with one another, e.g., directly or indirectly via wireless or wireline backhaul.

Wireless network 200 may be a homogeneous network that includes only macro eNBs. Wireless network 100 may also be a heterogeneous network that includes eNBs of different types, e.g., macro eNBs, pico eNBs, femto eNBs, relays, etc. These different types of eNBs may have different transmit power levels, different coverage areas, and different impact on interference in wireless network 200. For example, macro eNBs may have a high transmit power level (e.g., 20 Watts) whereas pico eNBs, femto eNBs, and relays may have a lower transmit power level (e.g., 1 Watt). The techniques described herein may be used for homogeneous and heterogeneous networks.

UEs 220 may be dispersed throughout wireless network 200, and each UE may be stationary or mobile. A UE may also be referred to as a terminal, a mobile station, a subscriber unit, a station, etc. For example, a UE may be a cellular phone, a personal digital assistant ("PDA"), a wireless modem, a wireless communication device, a handheld device, a laptop computer, a cordless phone, a wireless local loop ("WLL") station, etc. A UE may communicate with an eNB via the downlink ("DL") and uplink ("UL"). The downlink (or forward link) refers to the communication link from the eNB to the UE, and the uplink (or reverse link) refers to the communication link from the UE to the eNB. A UE may be able to communicate with macro eNBs, pico eNBs, femto eNBs, relay nodes, and/or other types of eNBs. In FIG. 2, a solid line with double arrows indicates desired transmissions between a UE and a serving eNB, which is an eNB designated to serve the UE on the downlink and/or uplink. A dashed line with double arrows indicates interfering transmissions between a UE and an eNB.

Figure 3:
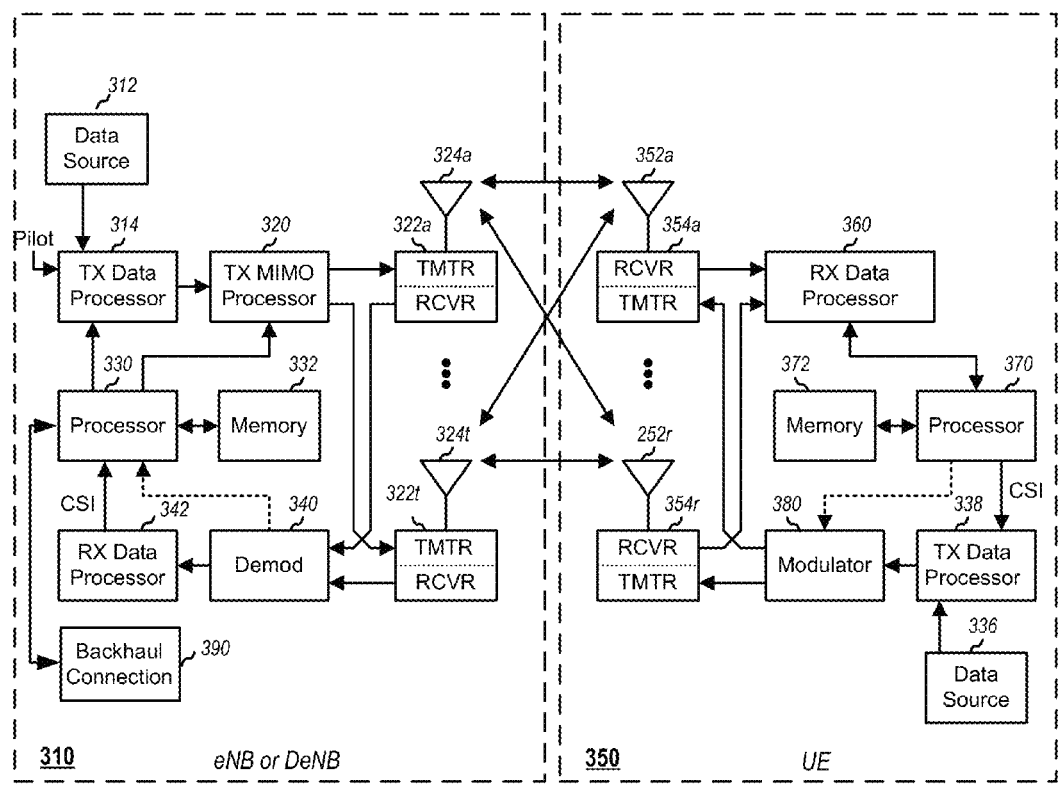
FIG. 3 illustrates a block diagram of an exemplary embodiment of an eNB and an exemplary UE in an exemplary wireless communication system.

FIG. 3 illustrates a block diagram of an exemplary embodiment of an eNB 310 and an exemplary UE 350 in an exemplary wireless communication system 300, which may be an LTE system, on which the aspects and functionality described herein may be implemented. A relay node ("RN") may be similarly configured to the illustrated eNB 310 and UE 350, so as to provide both transmit and receive functionality associated with eNB 310 and UE 350. In a relay node configuration, the RN may be in communication with a base station, such as a donor base station or eNB ("DeNB"), such as is shown in FIG. 2, and the DeNB may likewise be similarly configured to eNB 310.

Various functions may be performed in the processors and memories as shown in eNB 310 (and/or in other components not shown), such as coordination with other eNBs (not shown) and/or RNs to facilitate range extension or other relay functions, to transmit and receive signaling from other eNBs and UEs, as well as to provide other functionality as described herein. UE 350 may include one or more modules to receive signals from eNB 310 and/or other eNBs (not shown, such as non-serving base stations) to receive DL signals, determine channel characteristics, perform channel estimates, demodulate received data and generate spatial information, determine power level information, and/or determine other information associated with eNB 310 or other base stations (not shown).

In one embodiment, eNB 310 may coordinate with other base stations as described previously herein to determine, generate, and resend signaling, such as signaling associated with relay functionality as described here. This may be done in one or more components (or other components not shown) of eNB 310, such as processors 314, 330 and memory 332. eNB 310 may also include a transmit module including one or more components (or other components not shown) of eNB 310, such as transmit modules 324. eNB 310 may include an interference cancellation module including one or more components (or other components not shown), such as processors 330, 342, demodulator module 340, and memory 332 to provide relay functionality as described herein. eNB 310 may also include a control module for controlling receiver and relay functionality. eNB 310 may include a network connection module 390 to provide networking with other systems, such as backhaul systems in a core network (not shown).

Likewise, UE 350 may include a receive module including one or more components of UE 350 (or other components not shown), such as receivers 354. UE 350 may also include a signal information module including one or more components (or other components not shown) of UE 350, such as processors 360 and 370, and memory 372. In one embodiment, one or more signals received at UE 350 are processed to receive DL signals and/or extract information from the DL signals. Additional processing may include estimating channel characteristics, power information, spatial information and/or other information regarding eNBs, such as eNB 310 and/or other base stations (not shown). Memories 332 and 372 may be used to store computer code for execution on one or more processors, such as processors 360, 370 and 338, to implement processes associated with the aspects and functionality described herein.

In operation, at the eNB 310, traffic data for a number of data streams may be provided from a data source 312 to a transmit ("TX") data processor 314, where it may be processed and transmitted to one or more UEs 350. In one aspect, each data stream is processed and transmitted over a respective transmitter sub-system (shown as transmitters $324_1$-$324_{Nt}$) of eNB 310. TX data processor 314 receives, formats, codes, and interleaves the traffic data for each data stream based on a particular coding scheme selected for that data stream so as to provide coded data. In particular, base station 310 may be configured to determine a particular reference signal and reference signal pattern and provide a transmit signal including the reference signal and/or beamforming information in the selected pattern.

The coded data for each data stream may be multiplexed with pilot data using OFDM techniques. The pilot data is typically a known data pattern that is processed in a known manner and may be used at the receiver system to estimate the channel response. For example, the pilot data may include a reference signal. Pilot data may be provided to TX data processor 314 as shown in FIG. 3 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.) selected for that data stream so as to provide modulation symbols, and the data and pilot may be modulated using different modulation schemes. The data rate, coding, and modulation for each data stream may be determined by instructions performed by processor 330 based on instructions stored in memory 332, or in other memory or instruction storage media of UE 350 (not shown).

The modulation symbols for all data streams may then be provided to a TX MIMO processor 320, which may further process the modulation symbols (e.g., for OFDM implementation). TX MIMO processor 320 may then provide Nt modulation symbol streams to $N_t$ transmitters ("TMTR") $322_1$ through $322_{Nt}$. The various symbols may be mapped to associated RBs for transmission.

TX MIMO processor 330 may apply beamforming weights to the symbols of the data streams and corresponding to the one or more antennas from which the symbol is being transmitted. This may be done by using information such as channel estimation information provided by or in conjunction with the reference signals and/or spatial information provided from a network node such as a UE. For example, a beam B=transpose([b1 b2 ... $b_{Nt}$]) is composed of a set of weights corresponding to each transmit antenna. Transmitting along a beam corresponds to transmitting a modulation symbol x along all antennas scaled by the beam weight for that antenna; that is, on antenna t the transmitted signal is bt*x. When multiple beams are transmitted, the transmitted signal on one antenna is the sum of the signals corresponding to different beams. This can be expressed mathematically as B1x1+B2x2+$BN_S$x$N_S$, where $N_S$ beams are transmitted and xi is the modulation symbol sent using beam Bi. In various implementations beams could be selected in a number of ways. For example, beams could be selected based on channel feedback from a UE, channel knowledge available at the eNB, or based on information provided from a UE to facilitate interference mitigation, such as with an adjacent macrocell.

Each transmitter sub-system $322_1$ through $322_{Nt}$ receives and processes a respective symbol stream to provide one or more analog signals, and further conditions (e.g., amplifies, filters, and upconverts) the analog signals to provide a modulated signal suitable for transmission over the MIMO channel. $N_t$ modulated signals from transmitters $322_1$ through $322_{Nt}$ are then transmitted from $N_t$ antennas $324_1$ through $324_{Nt}$, respectively.

At UE 350, the transmitted modulated signals are received by $N_r$ antennas $352_1$ through $352_{Nr}$ and the received signal from each antenna 352 is provided to a respective receiver ("RCVR") $354_1$ through $352_{Nr}$. Each receiver 354 conditions (e.g., filters, amplifies and downconverts) a respective received signal, digitizes the conditioned signal to provide samples, and further processes the samples to provide a corresponding "received" symbol stream.

An RX data processor 360 then receives and processes the $N_r$ received symbol streams from $N_r$ receivers $354_1$ through $352_N$, based on a particular receiver processing technique so as to provide $N_S$ "detected" symbol streams so at to provide estimates of the $N_S$ transmitted symbol streams. The RX data processor 360 then demodulates, deinterleaves, and decodes each detected symbol stream to recover the traffic data for the data stream. The processing by RX data processor 360 is typically complementary to that performed by TX MIMO processor 320 and TX data processor 314 in base station 310.

A processor 370 may periodically determine a precoding matrix for use. Processor 370 may then formulate a reverse link message that may include a matrix index portion and a rank value portion. In various aspects, the reverse link message may include various types of information regarding the communication link and/or the received data stream. The reverse link message may then be processed by a TX data processor 338, which may also receive traffic data for a number of data streams from a data source 336 which may then be modulated by a modulator 380, conditioned by transmitters $354_1$ through $354_{Nr}$, and transmitted back to base station 310. Information transmitted back to base station 310 may include power level and/or spatial information for providing beamforming to mitigate interference from base station 310.

At base station 310, the modulated signals from UE 350 are received by antennas 324, conditioned by receivers 322, demodulated by a demodulator 340, and processed by a RX data processor 342 to extract the message transmitted by UE 350. Processor 330 then determines which pre-coding matrix to use for determining beamforming weights, and then processes the extracted message.

Figure 4:
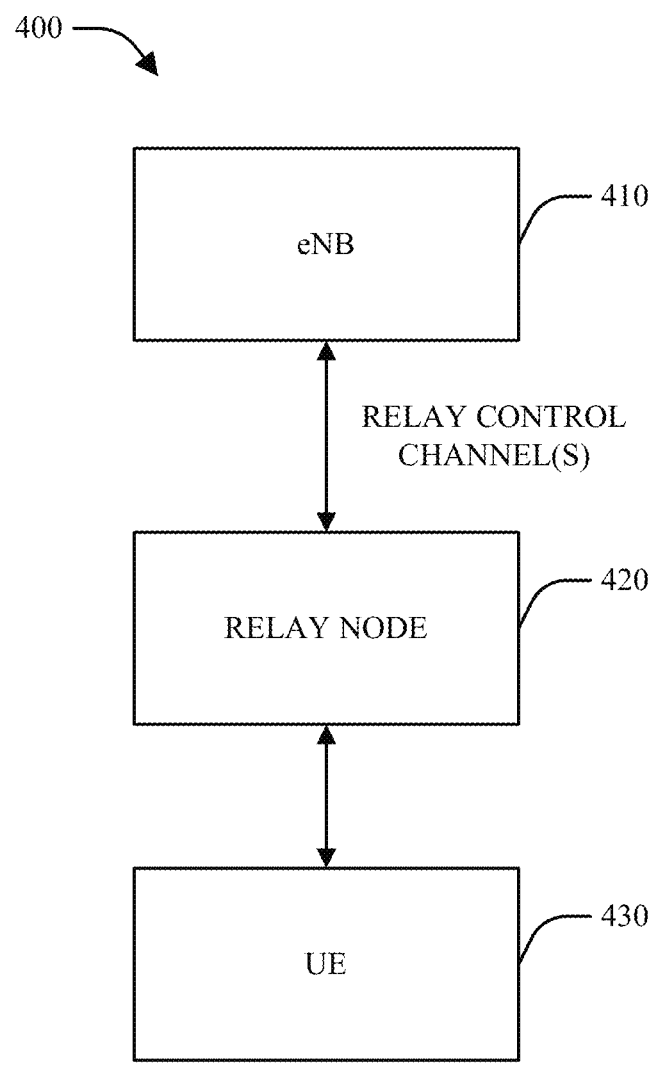
FIG. 4 illustrates a block diagram of a system for supporting relay backhaul communication within a wireless communication system.

Attention is now directed at FIG. 4, which illustrates a block diagram of a system 400 for supporting relay backhaul communication within a wireless communication system. System 400 can include one or more eNBs 410 (e.g., eNB 310 of FIG. 3), which can conduct respective UL and/or DL communications with one or more related UEs 430 (e.g., UE 350 of FIG. 3). In one embodiment, system 400 can support relay nodes 420, which can be employed to enhance communication between an eNB 410 and a UE 430. Relay node 420 may be, for example, a "Type 1" relay node or any other suitable relay type. As used herein, a Type 1 relay refers to a relay node 420 that appears as an independent eNB to a UE 430. As such, a Type 1 relay node can transmit its own synchronization channels, control channels, and so on.

In one embodiment, relay node 420 can be an in-band half-duplex relay node, which is not able to transmit and receive on the same band at the same time. Conventionally, it is appreciated that Multimedia Broadcast over a Single Frequency Network ("MBSFN") intervals can be used in order to create "blank periods" in which to receive DL communications from a donor eNB 410 on the backhaul link. However, due to the nature of MBSFN subframes (e.g., they contain PDCCH transmissions lasting one or two OFDM symbols), it is appreciated that relay node 420 can in some cases be unable to listen to PDCCH transmissions from the donor eNB 410. As a result, one or more relay control channels (e.g., R-PDCCH, R-PHICH, P-PCFICH, etc.) can be implemented between an eNB 410 and a relay node 420.

Accordingly, in various embodiments as described herein below, the relay control channel may be implemented as: (1) an FDM relay control channel (e.g., an FDM R-PDCCH); (2) a TDM/FDM relay control channel (e.g., a TDM/FDM R-PDCCH); and (3) as a joint R-PDCCH/R-PDSCH control channel.

Figure 5:
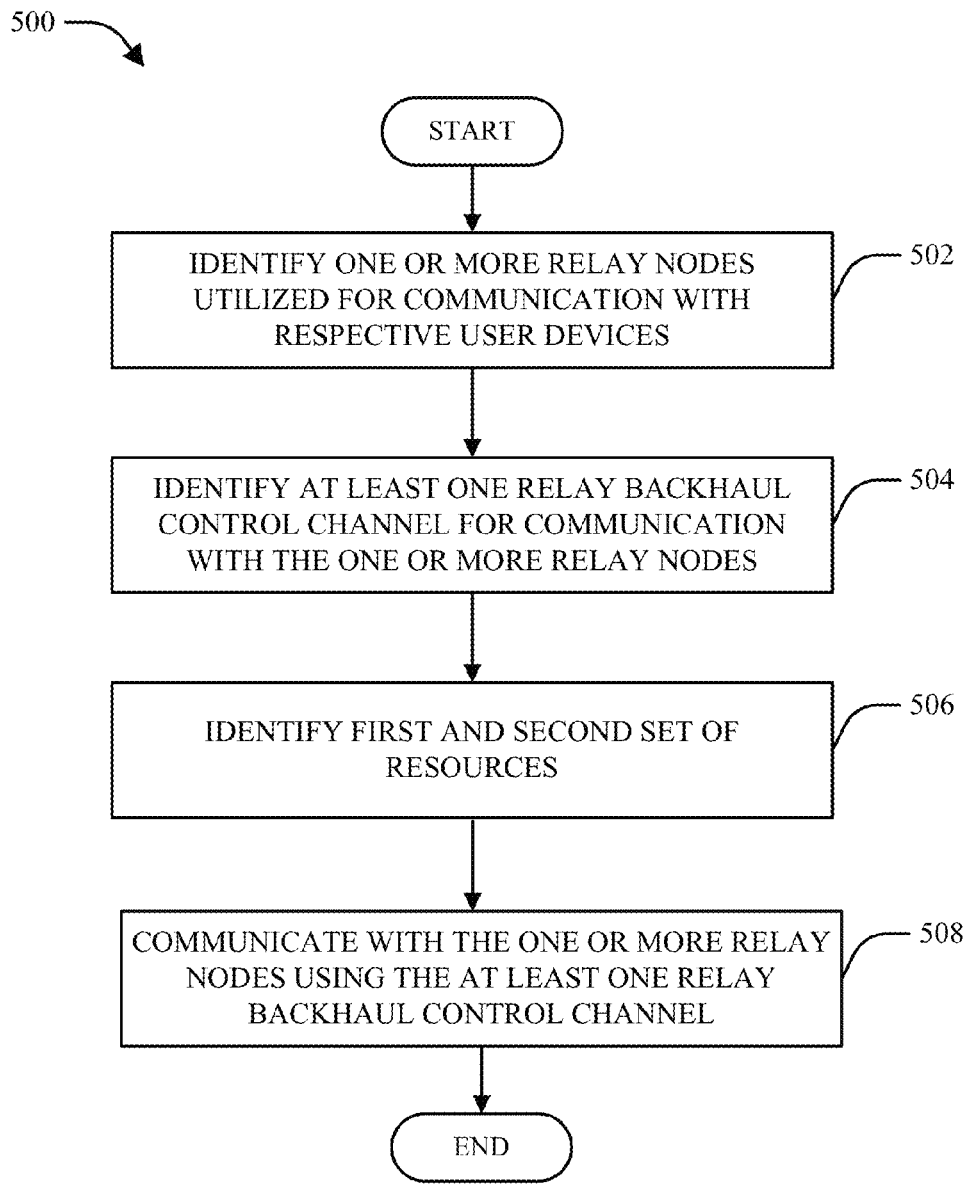
FIG. 5 is a flowchart for facilitating relay backhaul communication in a wireless communication system.

Referring now to FIG. 5, a methodology 500 for facilitating relay backhaul communication in a wireless communication system is described. First, at least one relay node utilized for communication with respective user devices (502) and at least one relay backhaul control channel for conducting communication with the at least one relay node are identified (504). The at least one relay backhaul control channel includes a control portion of a first set of resource blocks ("RBs").

Next, a first set of resources providing reference signals configured for demodulation of the at least one relay backhaul control channel is identified in the control portion of the first set of RBs (506). Similarly, a second set of resources providing reference signals configured for demodulation of at least one relay backhaul data channel is identified in the control portion of the first set of RBs. The second set of resources includes at least the first set of resources. Lastly, communication is conducted with the at least one relay node using the at least one relay backhaul control channel.

Figure 6:
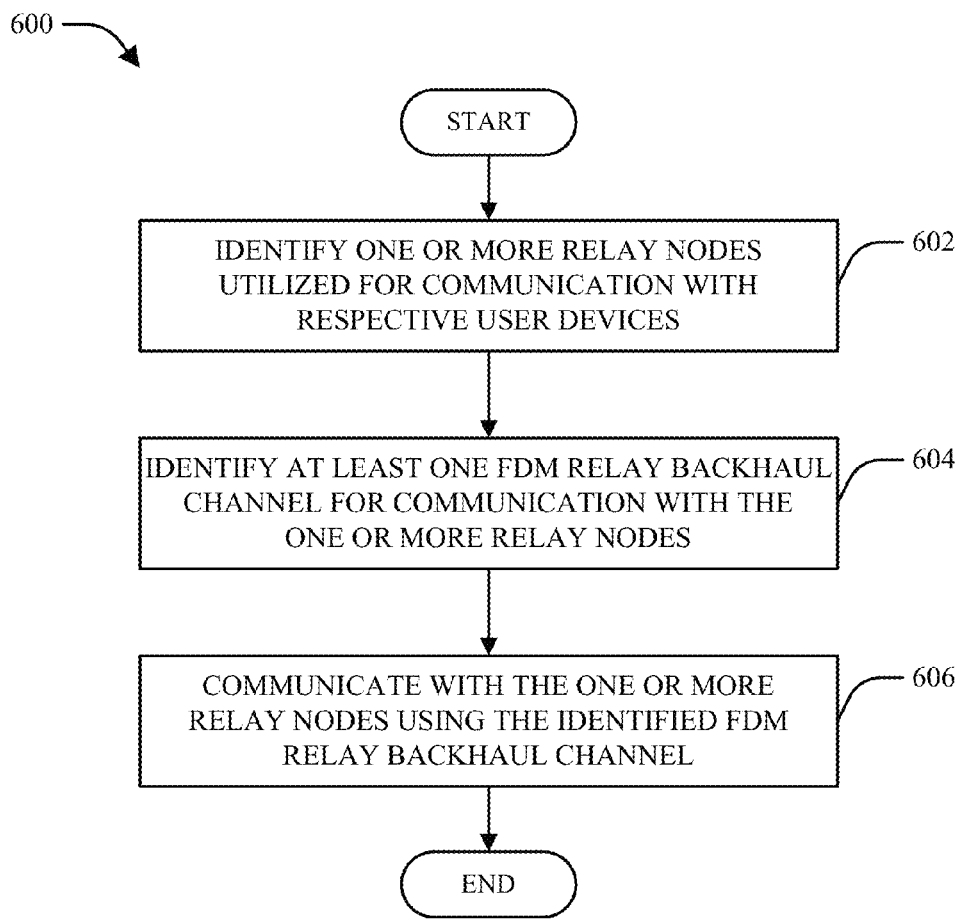
FIG. 6 is a flowchart for facilitating relay backhaul communication in a wireless communication system via an FDM relay control channel.

Referring now to FIG. 6, a methodology 600 for facilitating relay backhaul communication in a wireless communication system via an FDM relay control channel is described. First, one or more relay nodes utilized for communication with respective user devices are identified (602). Next, at least one FDM relay backhaul channel (or FDM relay control channel) is identified for communication with the one or more relay nodes (604). Communication is then conducted with the one or more relay nodes using the at least one FDM relay backhaul channel (606).

In one exemplary embodiment, the FDM relay control channel may be an FDM R-PDCCH that occupies respective resource blocks ("RBs") in the frequency domain. That is, the FDM relay control channel may be distributed in the frequency domain when there is more than one RB available. Different relays can be interleaved together on these RBs, which are used for control data. This embodiment provides various advantages, such as, for example: (1) the RBs carrying R-PDCCH can use the same or similar dedicated reference symbol (e.g., UE-RS) formats as compared to those defined for regular data (e.g., PDSCH); (2) expedited sharing of power between R-PDCCH and PDSCH; and (3) substantially seamless bandwidth sharing with data from both legacy and non-legacy UEs. Each R-PDCCH can be configured to span only a limited number of RBs (e.g., for processing time reasons).

Furthermore, because this approach allows for UE-RS based demodulation, beamforming may be used when the number of scheduled relays is less than the number of UE-RS ports. In rank 1 transmissions, for example, either closed-loop or open-loop beamforming may be utilized.

In the above example, if there are multiple RBs present, respective R-PDCCH grants can be multiplexed over a small number of RBs for processing time reasons. For example, the RBs containing a given R-PDCCH can be demodulated first so that the relay node can quickly find out its assignment and accordingly proceed with data demodulation.

In various wireless network implementations (e.g., LTE Rel-8), PDCCH, PCFICH, and/or PHICH are built based on the concept of REG. A REG can include four resource elements ("REs"), where one resource element represents one tone and one symbol. REGs can be defined on a per-symbol basis, where four tones in one symbol make one REG. If there are no common RS tones in the symbol, the four tones can be consecutive. Otherwise, since every six tones there could be two RS tones, the four tones can be defined as the remaining four tones in the six tones after excluding the two RS tones.

It is appreciated that PDCCH, PCFICH, and/or PHICH can be designed in the context of newer wireless network implementations (e.g., LTE-A) in the data region. In existing specifications, it can be appreciated that the REG definition only needs to consider common RS tones, since in such specifications PDCCH are only present in the control region. In newer specifications, however, a REG definition should consider common RS, dedicated or UE-specific RS, channel state information RS, and so on.

Figure 7:
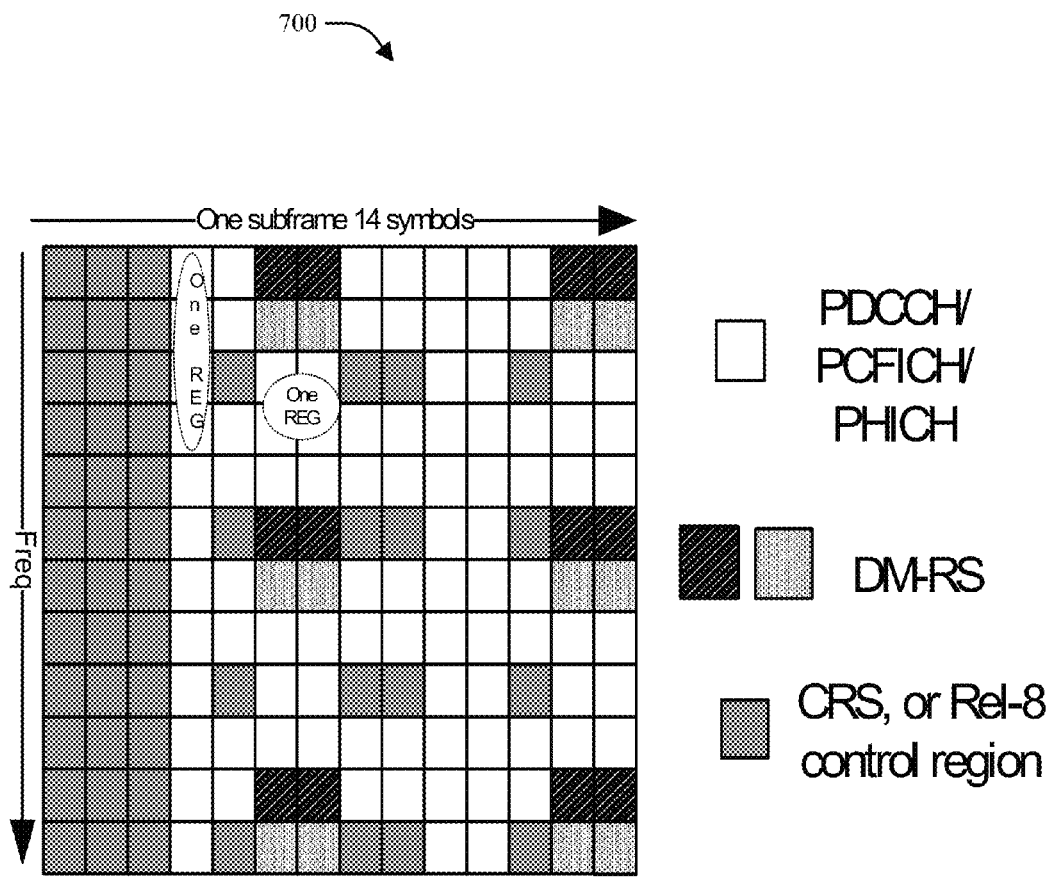
FIG. 7 is a block diagram illustrating a REG.
Figure 8:
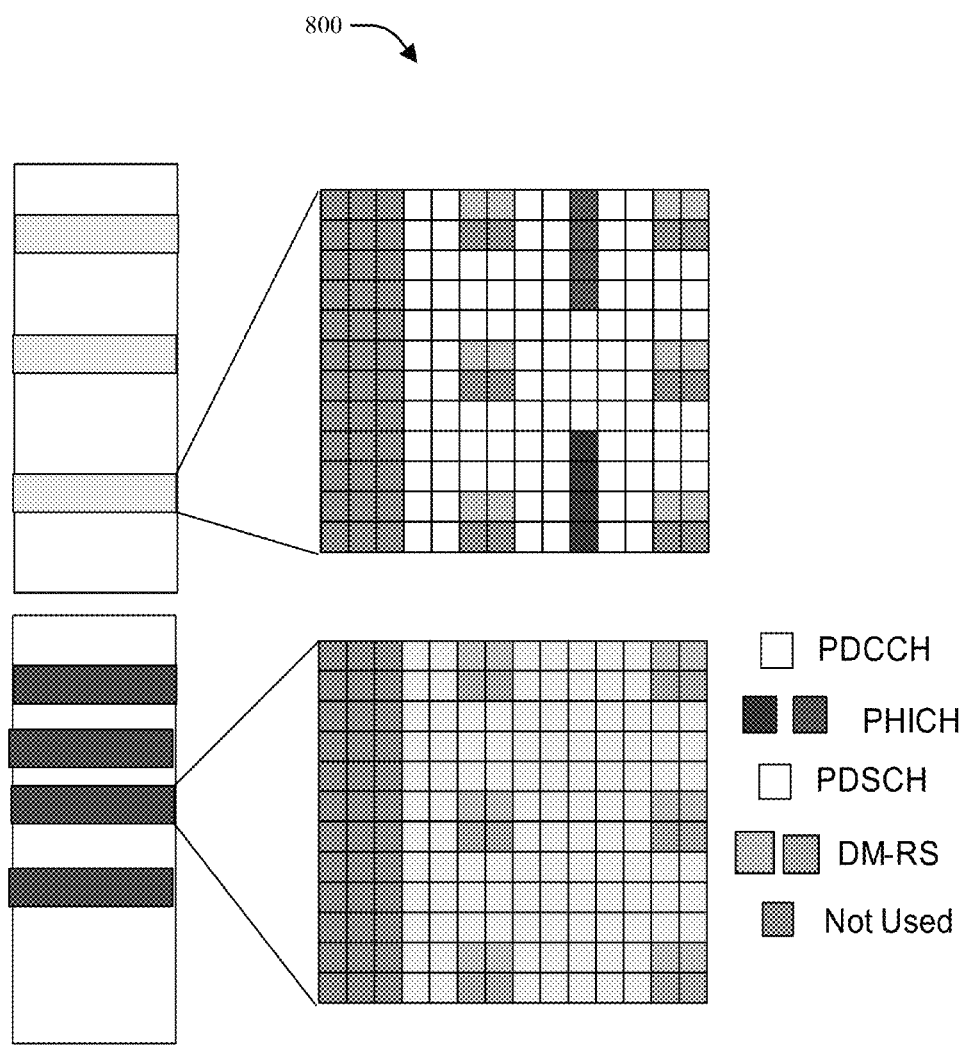
FIG. 8 is a block diagram illustrating an exemplary design of a FDM relay backhaul channel.

In particular, UE-specific RS (also called demod-RS, or DM-RS) can be designed in a mixed CDM and FDM fashion. For example, within 6 tones, there can be 3 tones occupied by UE-RS. Equivalently, within 12 tones, only 6 tones may be left for PDCCH/PCFICH/PHICH. Moreover, since UE-RS is CDMed over two or more symbols, it is also desirable from a performance perspective to carry control aligned with the UE-RS symbols. As a result, a REG can be defined in symbols containing UE-RS on a per-CDM set basis. For instance, if CDM length is 2 and UE-RS is defined across two adjacent symbols, the REG can be defined as a 2 (symbols) by 2 (tone) matrix. This is illustrated in FIG. 7 (where the same pattern for DM-RS denotes two DM-RS ports CDMed over two symbols in one subframe—14 symbols). An example of a design of a FDM-based relay control channel according to a REG is shown in FIG. 8.

Figure 9:
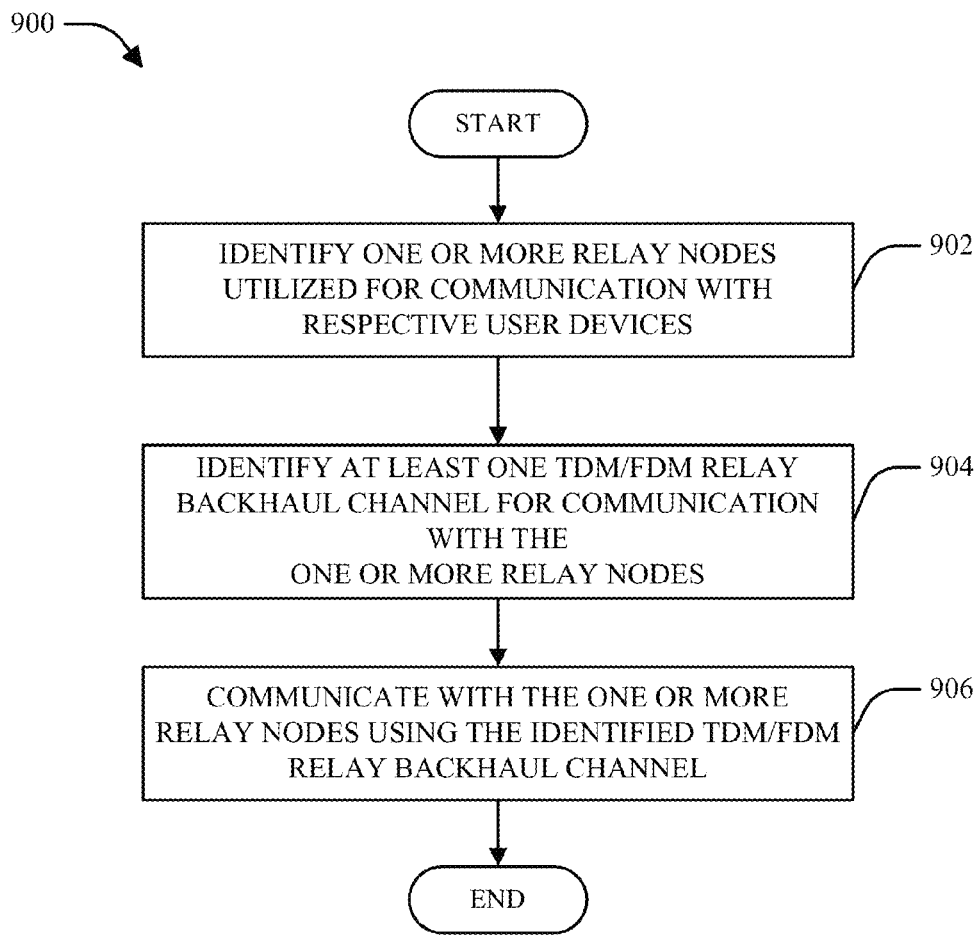
FIG. 9 is a flowchart for facilitating relay backhaul communication in a wireless communication system via a TDM/FDM relay control channel.

Referring now to FIG. 9, a methodology 900 for facilitating relay backhaul communication in a wireless communication system via a TDM/FDM relay control channel is described. First, one or more relay nodes utilized for communication with respective user devices are identified (902). Next, at least one TDM/FDM relay backhaul channel (or TDM/FDM relay control channel) is identified for communication with the one or more relay nodes (904). Communication is then conducted with the one or more relay nodes using the at least one TDM/FDM relay backhaul channel (906).

Figure 10:
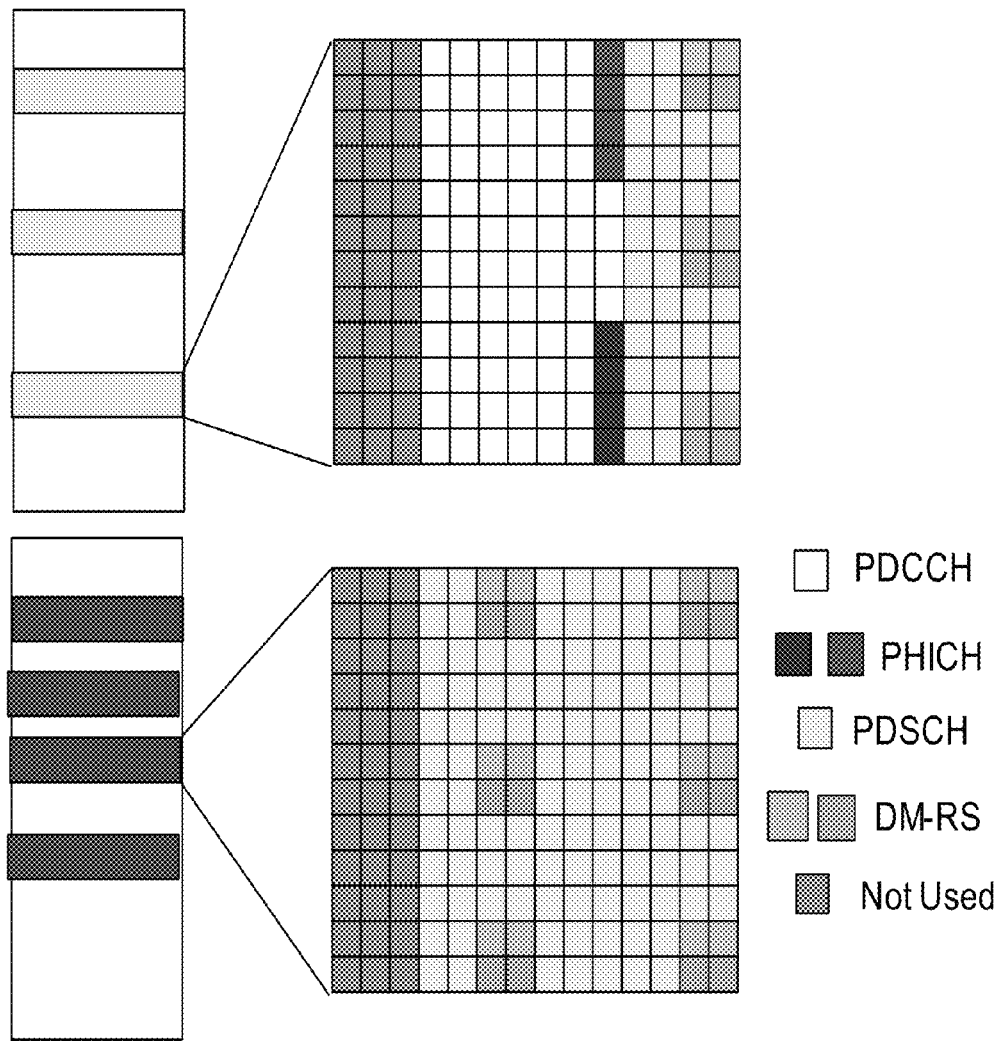
FIG. 10 is a block diagram illustrating an exemplary design of a TDM/FDM relay backhaul channel.

In one exemplary embodiment, relay control channels (e.g., R-PDCCH) from different UEs may be interleaved together but occupy only fractions of RBs. By way of specific example, the R-PDCCH can occupy the first few OFDM symbols of some RBs, that is, the first RB in a RB pair may be used for control and the other RB in the other RB pair may be used for data. Because this approach can span one or more RBs in the frequency domain, this may result in more interference diversity as compared to the FDM relay control channel described above with reference to FIG. 6. Additionally, R-PDCCH transmissions may finish early and potentially provide extra decoding time. An example of a design of such a TDM/FDM-based relay control channel according is shown in FIG. 10.

It is appreciated that this embodiment can leverage various aspects related to the reference symbols to be used for this TDM/FDM relay control channel. For example, in some cases this channel may not be able to rely on CRS, since CRS may not be present in all subframes (e.g., MBSFN subframes). Moreover, the remaining half of the RB can in some cases be used for PDSCH, and many network features may be configured to assume the use of UE-RS for PDSCH demodulation. Therefore, design of some UE-RS patterns can be implemented for both the R-PDCCH portion as well as the PDSCH portion of the RB.

As another alternative, a common UE-RS pattern can be utilized that spans the entire RB, which is used for demodulation of one or both of the R-PDCCH and the PDSCH. Yet another alternative is for the UE to carry out channel estimation based only on those UE-RS symbols in the control region. In such an example, the UE-RS can be designed to facilitate this operation such that, for example, there is no orthogonal spreading spanning more symbols than those in the control region.

Further, it is appreciated that the UE-RS pattern can in some cases be required to accommodate high enough rank for any data transmissions that are scheduled on an associated RB (e.g., even though R-PDCCH is always rank 1). As an alternative, rank 1 (or 2) UE-RS patterns can be used, data transmissions can be forced on an associated RB to be rank 1 (or 2, respectively), and data transmissions (e.g., even from the same code block) can be enabled on other RBs that have higher ranks. Another alternative is for the control transmission to assume that there are a certain number of UE-RS ports, in which case multiple UE-RS patterns can be accommodated that occupy only a subset of those ports.

It can be appreciated that if the patterns are designed such that the locations used for lower rank transmissions do not change when a higher rank pattern is used, then this may accommodate data transmissions up to the higher rank. The data transmissions can then use the unused UE-RS symbols for the case of low-rank transmissions. For example, UE-RS patterns can be designed such that the values at the locations for rank 1 or 2 do not change even if rank 4 patterns are used instead. In addition, it is appreciated that if a common UE-RS is used for R-PDCCH demodulation, then R-PDCCH transmission can in some cases not be limited to the first few OFDM symbols. Rather, R-PDCCH resource elements (REs) can be distributed throughout the RB in order to enable efficient power sharing.

Figure 11:
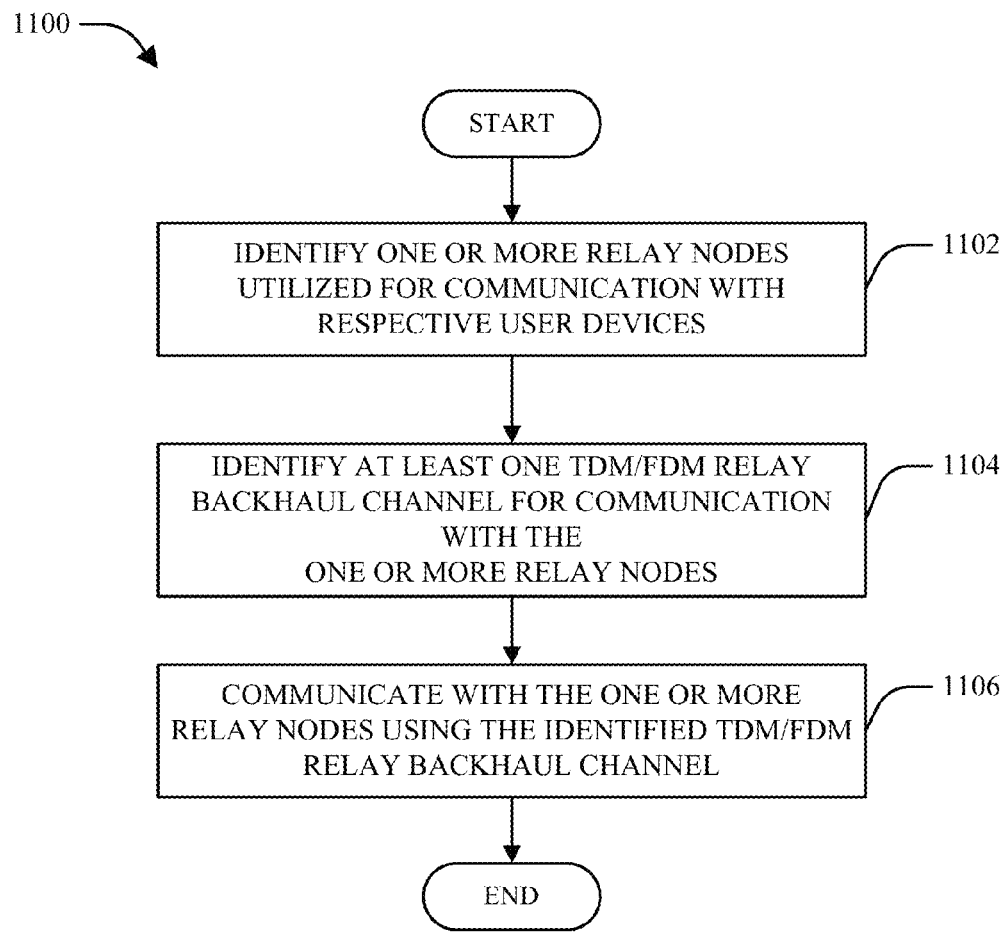
FIG. 11 is a flowchart for facilitating relay backhaul communication in a wireless communication system via a joint R-PDCCH/R-PDSCH relay control channel.

Referring now to FIG. 11, a methodology 1100 for facilitating relay backhaul communication in a wireless communication system via a joint R-PDCCH/R-PDSCH relay control channel is described. First, one or more relay nodes utilized for communication with respective user devices are identified (1102). Next, at least one joint R-PDCCH/R-PDSCH relay backhaul channel (or R-PDCCH/R-PDSCH relay control channel) is identified for communication with the one or more relay nodes (1104). Communication is then conducted with the one or more relay nodes using the at least one R-PDCCH/R-PDSCH relay backhaul channel (1106).

In this embodiment, a given RB can contain R-PDCCH and R-PDSCH transmissions for the same relay node. Accordingly, a common UE-RS can be utilized across the whole RB, based on which the RB can be precoded for the relay. Respective relays can be assigned a relay-specific RB on which to monitor for assignments/acknowledgements (e.g., PDCCH/PHICH in LTE). If PDCCH is indeed received, the relay can assume that its data (e.g., DSCH) is wrapped around the PDCCH/PHICH or, alternatively, is punctured by PDCCH/PHICH. On the other hand, if there are no PDCCHs/PHICHs to transmit to this relay, the eNB can assign this RB to another UE and/or relay which would be unaware of the PDCCH/PHICH allocation.

In one example, the R-PDCCH can also span multiple RBs (or parts of multiple RBs) so as to achieve better diversity. As in the TDM/FDM relay control channel case, it is appreciated that the UE-RS pattern can be configured to accommodate high enough rank for any data transmissions that are scheduled on an associated RB (e.g., even though R-PDCCH is always rank 1). As an alternative, rank 1 (or 2) UE-RS patterns can be used, data transmissions can be forced on an associated RB to be rank 1 (or 2, respectively), and data transmissions (e.g., even from the same code block) can be enabled on other RBs that have higher ranks. It is appreciated that such an implementation could lead to some mismatch in code rates among different ranks of the same code block. Similarly, it can be appreciated that if the patterns are designed such that the locations used for lower rank transmissions do not change when a higher rank pattern is used, then this may accommodate data transmissions up to the higher rank. The data transmissions can then use the unused UE-RS symbols for the case of low-rank transmissions.

In one aspect, if a given relay has control (e.g., in support of UL (PDCCH, PHICH, etc.)) but no data, then in some cases where the above option is utilized the remaining part of a given RB may not be assignable to other relays/UEs. One option to bypass this restriction is to break up the RB into smaller parts, for example, by using some resource elements for control data and other resource elements for non-control data. PDCCH grants can then index the sub-RBs and assign those resource elements of the RB not used by the eNB for PDSCH transmissions.

In this alternative, it can be appreciated that the R-PDCCH can be distributed throughout the entire RB or it can be clustered (e.g., in the initial few OFDM symbols of the RB). Moreover, in this case a relay can in some cases be asked to monitor multiple RBs, since the possibility for unused control resources to go to waste is mitigated. In another example, relay PDCCH resources can be shared with PDSCH resources for other relays/UEs, making it substantially similar to the TDM/FDM relay control channel described above.

It is appreciated that, for any of the above options, the design of R-PDCCH is not intended to be limited to supporting relays only. For example, the same channel can additionally be used to send assignments to other non-legacy UEs.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for facilitating relay backhaul communication in a wireless communication system using at least one relay node, the method comprising:
   identifying at least one relay node utilized for communication with respective user devices;
   identifying at least one relay backhaul control channel for conducting communication with the at least one relay node, wherein the at least one relay backhaul control channel comprises a control portion of a first set of resource blocks (RBs);
   identifying, in the control portion of the first set of RBs, a first set of resources providing reference signals configured for demodulation of the at least one relay backhaul control channel;
   identifying, in the control portion of the first set of RBs, a second set of resources providing reference signals configured for demodulation of at least one relay backhaul data channel, the second set of resources including at least the first set of resources; and
   communicating with the at least one relay node using the at least one relay backhaul control channel.

2. The method of claim 1, wherein the at least one relay backhaul data channel comprises a non-control potion of a second set of RBs.

3. The method of claim 2, wherein the first set of RBs and the second set of RBs are not overlapped.

4. The method of claim 2, wherein the non-control portion comprises all set of resources of the second set of RBs.

5. The method of claim 2, wherein the first set of RBs and the second set of RBs are at least partially overlapped.

6. The method of claim 5, wherein the non-control portion of the second set of RBs is free of resources belonging to the control portion of the first second of RBs.

7. The method of claim 2, wherein the first set of resources comprises the second set of resources.

8. The method of claim 7, wherein a rank of transmission associated with the relay backhaul data channel is limited by the first set of resources.

9. The method of claim 2, wherein the second set of resources is larger than the first set of resources.

10. The method of claim 9, wherein a rank of transmission associated with the relay backhaul data channel is limited by the second set of resources.

11. The method of claim 1, wherein the reference signals are common reference signals.

12. The method of claim 1, wherein the reference signals are relay node specific reference signals.

13. The method of claim 1, wherein the control portion comprises all the resources of the first set of RBs.

14. The method of claim 1, wherein the control portion comprises only a fraction of the resources of the first set of RBs.

15. The method of claim 1, wherein the at least one relay backhaul channel comprises one or more of R-PDCCH, R-PHICH, or R-PCFICH.

16. The method of claim 1, wherein identifying at least one relay backhaul channel comprises identifying a R-PDCCH occupying respective RBs in the frequency domain.

17. The method of claim 16, further comprising interleaving multiple relay nodes on the respective RBs.

18. The method of claim 17, wherein the interleaving is performed based on a resource element group (REG).

19. The method of claim 18, wherein the REG comprises four resource elements (REs).

20. The method of claim 19, wherein the four REs comprise four REs substantially adjacent to each other in the frequency domain within one OFDM symbol.

21. The method of claim 20, wherein each relay backhaul control channel comprises a granularity of 9 REGs.

22. The method of claim 1, wherein identifying at least one relay backhaul control channel comprises identifying a R-PDCCH occupying time-domain fractions of respective RBs in the frequency domain.

23. The method of claim 1, wherein identifying at least one relay backhaul channel comprises identifying at least one RB containing resources for R-PDCCH transmission and PDSCH transmission.

24. An apparatus for facilitating relay backhaul communication in a wireless communication system, the apparatus comprising:
   a memory; and
   at least one processor coupled to the memory and configured to:
      identify at least one relay node utilized for communication with respective user devices;
      identify at least one relay backhaul control channel for conducting communication with the at least one relay node, wherein the at least one relay backhaul control channel comprises a control portion of a first set of resource blocks (RBs);
      identify a first set of resources in the control portion of the first set of RBs, the first set of resources providing reference signals configured for demodulation of the at least one relay backhaul control channel;
      identify a second set of resources in the control portion of the first set of RBs, the second set of resources providing reference signals configured for demodulation of at least one relay backhaul data channel and including at least the first set of resources; and
      communicate with the at least one relay node using the at least one relay backhaul control channel.

25. The apparatus of claim 24, wherein the at least one relay backhaul data channel comprises a non-control potion of a second set of RBs.

26. The apparatus of claim 25, wherein the first set of RBs and the second set of RBs are not overlapped.

27. The apparatus of claim 25, wherein the non-control portion comprises all set of resources of the second set of RBs.

28. The apparatus of claim 25, wherein the first set of RBs and the second set of RBs are at least partially overlapped.

29. The apparatus of claim 28, wherein the non-control portion of the second set of RBs is free of resources belonging to the control portion of the first second of RBs.

30. The apparatus of claim 24, wherein the first set of resources comprises the second set of resources.

31. The apparatus of claim 24, wherein a rank of transmission associated with the relay backhaul data channel is limited by the first set of resources.

32. The apparatus of claim 24, wherein the second set of resources is larger than the first set of resources.

33. The apparatus of claim 25, wherein a rank of transmission associated with the relay backhaul data channel is limited by the second set of resources.

34. The apparatus of claim 24, wherein the reference signals are common reference signals.

35. The apparatus of claim 24, wherein the reference signals are relay node specific reference signals.

36. The apparatus of claim 24, wherein the control portion comprises all the resources of the first set of RBs.

37. The apparatus of claim 24, wherein the control portion comprises only a fraction of the resources of the first set of RBs.

38. The apparatus of claim 24, wherein the at least one relay backhaul channel comprises one or more of R-PDCCH, R-PHICH, or R-PCFICH.

39. The apparatus of claim 24, wherein the at least one relay backhaul channel comprises a R-PDCCH occupying respective RBs in the frequency domain.

40. A computer program product for facilitating relay backhaul communication in a wireless communication system using at least one relay node, the computer program product comprising:
a non-transitory computer-readable medium comprising code for:
identifying at least one relay node utilized for communication with respective user devices;
identifying at least one relay backhaul control channel for conducting communication with the at least one relay node, wherein the at least one relay backhaul control channel comprises a control portion of a first set of resource blocks (RBs);
identifying, in the control portion of the first set of RBs, a first set of resources providing reference signals configured for demodulation of the at least one relay backhaul control channel;
identifying, in the control portion of the first set of RBs, a second set of resources providing reference signals configured for demodulation of at least one relay backhaul data channel, the second set of resources including at least the first set of resources; and
communicating with the at least one relay node using the at least one relay backhaul control channel.

41. The computer program product of claim 40, wherein the at least one relay backhaul data channel comprises a non-control potion of a second set of RBs.

42. The computer program product of claim 41, wherein the first set of RBs and the second set of RBs are not overlapped.

43. The computer program product of claim 41, wherein the non-control portion comprises all set of resources of the second set of RBs.

44. The computer program product of claim 41, wherein the first set of RBs and the second set of RBs are at least partially overlapped.

45. The computer program product of claim 41, wherein the non-control portion of the second set of RBs is free of resources belonging to the control portion of the first second of RBs.

46. The computer program product of claim 41, wherein the first set of resources comprises the second set of resources.

47. The computer program product of claim 46, wherein a rank of transmission associated with the relay backhaul data channel is limited by the first set of resources.

48. The computer program product of claim 40, wherein the second set of resources is larger than the first set of resources.

49. The computer program product of claim 40, wherein a rank of transmission associated with the relay backhaul data channel is limited by the second set of resources.

50. The computer program product of claim 40, wherein the reference signals are common reference signals.

51. The computer program product of claim 40, wherein the reference signals are relay node specific reference signals.

52. The computer program product of claim 40, wherein the control portion comprises all the resources of the first set of RBs.

53. The computer program product of claim 40, wherein the control portion comprises only a fraction of the resources of the first set of RBs.

54. The computer program product of claim 40, wherein the at least one relay backhaul channel comprises one or more of R-PDCCH, R-PHICH, or R-PCFICH.

55. The computer program product of claim 40, wherein identifying at least one relay backhaul channel comprises identifying a R-PDCCH occupying respective RBs in the frequency domain.

56. The computer program product of claim 55, further comprising interleaving multiple relay nodes on the respective RBs.

57. The computer program product of claim 56, wherein the interleaving is performed based on a resource element group (REG).

58. The computer program product of claim 57, wherein the REG comprises four resource elements (REs).

59. The computer program product of claim 58, wherein the four REs comprise four REs substantially adjacent to each other in the frequency domain within one OFDM symbol.

60. The computer program product of claim 57, wherein each relay backhaul control channel comprises a granularity of 9 REGs.

61. The computer program product of claim 40, wherein identifying at least one relay backhaul control channel comprises identifying a R-PDCCH occupying time-domain fractions of respective RBs in the frequency domain.

62. The computer program product of claim 40, wherein identifying at least one relay backhaul channel comprises identifying at least one RB containing resources for R-PDCCH transmission and PDSCH transmission.

63. An apparatus for facilitating relay backhaul communication in a wireless communication system using at least one relay node, the apparatus comprising:
means for identifying at least one relay node utilized for communication with respective user devices;
means for identifying at least one relay backhaul control channel for conducting communication with the at least one relay node, wherein the at least one relay backhaul control channel comprises a control portion of a first set of resource blocks (RBs);
means for identifying, in the control portion of the first set of RBs, a first set of resources providing reference signals configured for demodulation of the at least one relay backhaul control channel;
means for identifying, in the control portion of the first set of RBs, a second set of resources providing reference signals configured for demodulation of at least one relay backhaul data channel, the second set of resources including at least the first set of resources; and
means for communicating with the at least one relay node using the at least one relay backhaul control channel.

\* \* \* \* \*